(12) United States Patent
Andoh

(10) Patent No.: US 8,532,847 B1
(45) Date of Patent: Sep. 10, 2013

(54) VIBRATION SUPPRESSING DEVICE FOR SPACECRAFT

(71) Applicant: Fukashi Andoh, Toyota (JP)

(72) Inventor: Fukashi Andoh, Toyota (JP)

( * ) Notice: Subject to any disclaimer, the term of this patent is extended or adjusted under 35 U.S.C. 154(b) by 0 days.

(21) Appl. No.: 13/629,671

(22) Filed: Sep. 28, 2012

(51) Int. Cl.
*G06F 17/10* (2006.01)

(52) U.S. Cl.
USPC ............. 701/13; 703/2; 244/173.2; 700/31

(58) Field of Classification Search
USPC ............ 701/3, 10, 13; 703/2; 700/28–31; 244/173.1, 173.2, 173.3; 188/378, 379
See application file for complete search history.

(56) References Cited

U.S. PATENT DOCUMENTS

| | | | | |
|---|---|---|---|---|
| 4,914,564 A | * | 4/1990 | Surauer et al. | 700/33 |
| 5,374,011 A | * | 12/1994 | Lazarus et al. | 244/99.8 |
| 6,185,470 B1 | * | 2/2001 | Pado et al. | 700/104 |
| 6,252,334 B1 | * | 6/2001 | Nye et al. | 310/328 |
| 6,735,838 B1 | * | 5/2004 | Triller et al. | 29/25.35 |
| 7,461,728 B2 | * | 12/2008 | Huston et al. | 188/378 |
| 7,967,282 B2 | * | 6/2011 | Boyd et al. | 267/293 |
| 8,033,111 B2 | * | 10/2011 | Maeding | 60/725 |
| 2007/0032890 A1 | * | 2/2007 | Zhou et al. | 700/63 |
| 2007/0067049 A1 | * | 3/2007 | Zhou et al. | 700/28 |

OTHER PUBLICATIONS

Williams, T. Model Reduction by Subsystem Balancing: Application to the Space Station, IEEE, American Control Conference, 1994, pp. 3428-3432.*

Skelton et al, R.E. Modal Cost Analysis of Flexible Space Structures with Uncertain Modal Data, 19th IEEE Conference on Decision and Control including the Symposium on Adaptive Processes, 1980, pp. 792-794.*

* cited by examiner

*Primary Examiner* — Russell Frejd

(57) ABSTRACT

A vibration suppressing device for a spacecraft. A plurality of spacecraft deflection sensors measure a plurality of spacecraft deflections at specified locations on a spacecraft structure. A spacecraft modal coordinate calculation unit calculates a plurality of spacecraft modal coordinates. A high pass filter extracts a plurality of fluctuations of spacecraft modal coordinates. A cost function calculation unit calculates a cost function as a function of the plurality of fluctuations of spacecraft modal coordinates. A payload position calculation unit calculates an optimal payload position minimizing the cost function. A payload position adjustment device generates a control input suppressing a vibration transmitted to the payload system, and adjusts the payload position to the optimal payload position.

1 Claim, 8 Drawing Sheets

VIBRATION SUPPRESSING DEVICE FOR SPACECRAFT

BACKGROUND OF THE INVENTION

The present invention relates to a vibration suppressing device for spacecrafts that protects astronaut crews and sensitive electronic devices of the spacecrafts from a pogo oscillation, a combustion oscillation in rocket engines.

The spacecrafts produce self-excited combustion oscillation of a propellant called pogo oscillation during lift-off. The pogo oscillation can cause a vibration of a payload system that impairs astronaut crews' ability to perform piloting functions, and permanently damages electronics, optics and other sensitive equipment. To minimize the impairment of astronaut crews' ability and the permanent damage to sensitive equipments, the spacecrafts are generally designed to suppress the vibration both passively and actively.

U.S. Pat. No. 8,033,111 B2 discloses a device for damping a plurality of vibrations of a combustion chamber utilizing an acoustic resonator adjusted to a plurality of hazardous frequencies that can cause the pogo oscillation of the spacecraft. As a passive vibration suppression not at the source, U.S. Pat. No. 7,967,282 B2 discloses a vibration isolation mount consisting of a plurality of elastomeric members, a break frequency and a damping ratio of each of which are adjusted to suppress a vibration of a particular frequency and amplitude such that a plurality of vibrations transmitted to the payload system are attenuated. L. A. Nassar, R. Bonifant, C. Diggs, E. Hess, R. Homb, L. McNair, E. Moore, P. Obrist, M. Southward, "Spacecraft Structures and Launch Vehicles", Nov. 18, 2004 discusses a structural design of the spacecraft minimizing an amount of the plurality of vibrations transmitted to the payload system while fulfilling a requirement for maximum payload capacity. Further, U.S. Pat. No. 7,461,728 B2 discloses an active vibration damping system that suppresses a vibration transmitted to the payload system by actuating an active mass.

The prior arts in U.S. Pat. No. 8,033,111 B2, U.S. Pat. No. 7,967,282 B2, and L. A. Nassar, R. Bonifant, C. Diggs, E. Hess, R. Homb, L. McNair, E. Moore, P. Obrist, M. Southward, "Spacecraft Structures and Launch Vehicles", Nov. 18, 2004 fail to provide a best vibration suppression performance for varying relative contributions from the plurality of vibrations of different frequency under an influence of a climatical condition, an altitude and an amount of a residual propellant at an instant during lift-off, and for varying length of the spacecraft after a used stage thereof is disconnected, since they are adjusted to suppress only the plurality of vibrations of a plurality of fixed frequencies and amplitudes. On the other hand, after the application of U.S. Pat. No. 7,461,728 B2 a plurality of non-negligible amount of vibrations are transmitted to the payload system, since a phase of a motion of the active mass cannot be made completely opposite to that of the plurality of vibrations transmitted to the payload system due to a time delay in a control loop including a plurality of sensors, a logic circuit, an actuator and the active mass.

SUMMARY OF THE INVENTION

The present invention provides a vibration suppressing device for spacecraft carrying a payload system into space while protecting the payload system from a self-excited combustion oscillation of a propellant.

The vibration suppressing device includes:

a plurality of spacecraft deflection sensors measuring a plurality of spacecraft deflections at a plurality of locations on the spacecraft structure;

a spacecraft modal coordinate calculation unit calculating a plurality of spacecraft modal coordinates based on the plurality of spacecraft deflections received from the plurality of spacecraft deflection sensors using a modal transformation;

a high pass filter extracting a plurality of fluctuations of spacecraft modal coordinates from the spacecraft modal coordinates received from the spacecraft modal coordinate calculation unit;

a cost function calculation unit calculating a cost function that is a squared weighted sum of a plurality of eigenfunctions of the spacecraft structure as a function of a payload position where the payload system is attached to the spacecraft structure with a plurality of weights being proportional to a plurality of absolute values of a plurality of fluctuations of the spacecraft modal coordinates of a plurality of modes received from the high pass filter which the plurality of eigenfunctions belong to;

a payload position calculation unit calculating an optimal payload position minimizing the cost function received from the cost function calculation unit either by an analytical method or a numerical method;

a payload position adjustment device consisting of an actuator mechanically connected to the mechanical fixer and the spacecraft structure, generating a control input proportional to a time derivative of the plurality of spacecraft modal coordinates, adjusting the payload position based on the optimal payload position received from the payload position calculation unit, and minimizing a vibration transmitted from the spacecraft structure to the mechanical fixer and thus to the payload system. This construction causes the payload system to be located at a location on the spacecraft structure where the payload system does not interfere with the other spacecraft components such as a propulsion system and the amplitude of vibration transmitted from the spacecraft structure to the payload system is minimized, and minimizes the impairment of astronaut crews' ability and the permanent damage to sensitive equipments on the payload system.

BRIEF DESCRIPTION OF THE DRAWINGS

The novel features of the invention will be readily understood and appreciated by reference to the following detailed description taken in conjunction with the drawings, in which.

DETAILED DESCRIPTION OF THE INVENTION

Figure 3:
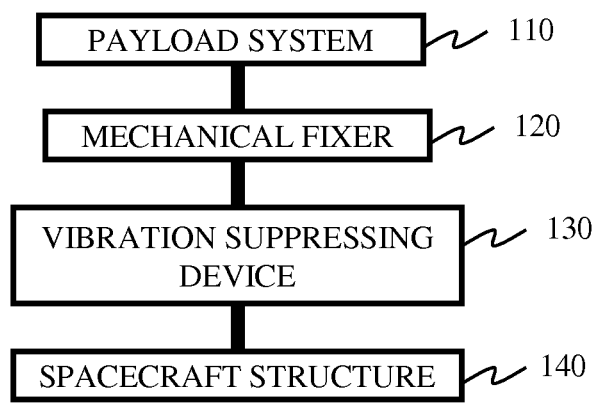
FIG. 3 is a general system configuration of a spacecraft of the type of which an exemplary embodiment of the invention may be advantageously employed.

FIG. 3 is a general system configuration of a spacecraft of the type of which an exemplary embodiment of the invention may be advantageously employed. The spacecraft includes: a payload system 110, a mechanical fixer 120, a vibration suppressing device 130, and a spacecraft structure 140.

The payload system 110 is an object carried into space by the spacecraft. Examples of the payload system include manned/unmanned space exploration vehicles and satellites.

The mechanical fixer 120 mechanically connects the payload system 110 to the vibration suppressing device 130.

The vibration suppressing device 130 suppresses a vibration transmitted from the spacecraft structure 140 to the mechanical fixer 120 and thus to the payload system 110 by applying a control input to the mechanical fixer 120 and the spacecraft structure 140, and by adjusting a position of the mechanical fixer 120 and the payload system 110 (hereinafter referred to as "the payload position") based on a measured spacecraft deflection. The vibration is caused by self-excited combustion of a propellant and is called pogo oscillation.

The spacecraft structure 140 consists of a mechanical structure of the spacecraft, and a propulsion system. The mechanical structure of the spacecraft typically includes a nosecone, a mechanical frame and a plurality of fins, and forms the basic shape of the spacecraft. The mechanical structure of the spacecraft mounts the payload system 110 and a plurality of other spacecraft components, and protects them from a heat of air friction during flight. The propulsion system typically includes a plurality of propellant tanks, a plurality of pumps and a combustion chamber with nozzle, and produces thrust by an expulsion of a high-speed fluid exhaust generated by high-pressure combustion of the propellant.

Figure 1:
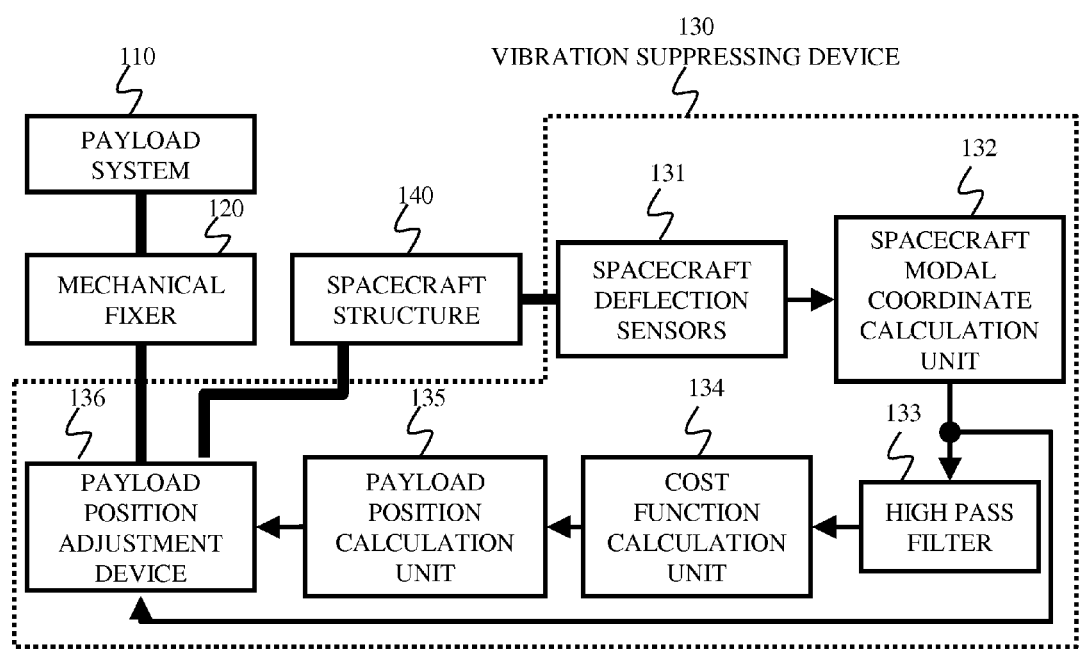
FIG. 1 is a block diagram of a vibration suppressing device for spacecraft in accordance with an exemplary embodiment of the invention.

FIG. 1 is a block diagram of the vibration suppressing device for spacecraft in accordance with an exemplary embodiment of the invention. The vibration suppressing device 130 includes: a plurality of spacecraft deflection sensors 131, a spacecraft modal coordinate calculation unit 132, a high pass filter 133, a cost function calculation unit 134, a payload position calculation unit 135, and a payload position adjustment device 136.

The plurality of spacecraft deflection sensors 131 measure a plurality of deflections at a plurality of locations on the spacecraft (hereinafter referred to as "the plurality of measured spacecraft deflections"), and send the plurality of measured spacecraft deflections to the spacecraft modal coordinate calculation unit 132.

The spacecraft modal coordinate calculation unit 132 calculates a plurality of modal coordinates of the spacecraft (hereinafter referred to as "the plurality of spacecraft modal coordinates") based on the plurality of measured spacecraft deflections using a modal transformation, and sends the plurality of spacecraft modal coordinates to the high pass filter 133.

The high pass filter 133 extracts a plurality of high frequency components of the plurality of spacecraft modal coordinates (hereinafter referred to as "the plurality of fluctuations of spacecraft modal coordinates") from the plurality of spacecraft modal coordinates, and sends the plurality of fluctuations of spacecraft modal coordinates to the cost function calculation unit 134.

The cost function calculation unit 134 calculates a squared weighted sum of a plurality of eigenfunctions of the spacecraft structure 140 as a function of the payload position with a plurality of weights being proportional to a plurality of absolute values of the plurality of fluctuations of spacecraft modal coordinates of a plurality of modes which the plurality of eigenfunctions belong to, and sends a calculated value to the payload position calculation unit 135 as a cost function.

The payload position calculation unit 135 calculates the payload position minimizing the cost function either by an analytical method or a numerical method, and sends a calculated value to the payload position adjustment device 136 as an optimal payload position. Examples of the analytical method include calculus of variation, and examples of the numerical method include binary search method and brute force method.

The payload position adjustment device 136 consists of an actuator mechanically connected to the mechanical fixer 120 and the spacecraft structure 140, generates the control input proportional to a time derivative of the plurality of spacecraft modal coordinates, adjusts the payload position based on the optimal payload position received from the payload position calculation unit 135, and minimizes the vibration transmitted from the spacecraft structure 140 to the mechanical fixer 120 and thus to the payload system 110.

Derived in what follows is a procedure whereby the vibration suppressing device generates the control input to suppress the vibration transmitted from the spacecraft structure 140 to the payload system 110, calculates the optimal payload position based on the plurality of measured spacecraft deflections, and adjusts the payload position to minimize the vibration.

Figure 4:
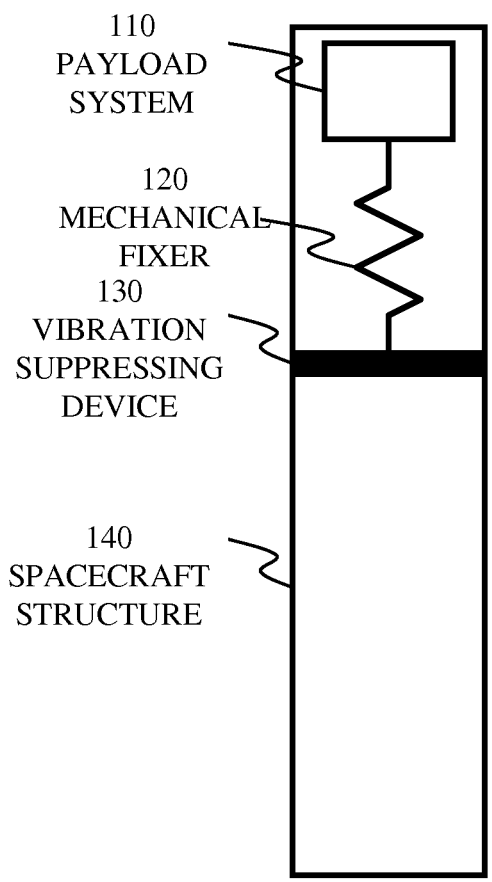
FIG. 4 is a diagram showing a mechanism of the spacecraft of the type of which an exemplary embodiment of the invention may be advantageously employed.

FIG. 4 is a diagram showing a mechanism of the spacecraft of the type of which an exemplary embodiment of the invention may be advantageously employed. In FIG. 4 the payload system 110, the mechanical fixer 120 and the vibration suppressing device 130 are modeled as a lumped parameter system, and the spacecraft structure 140 as a distributed parameter system.

Figure 5:
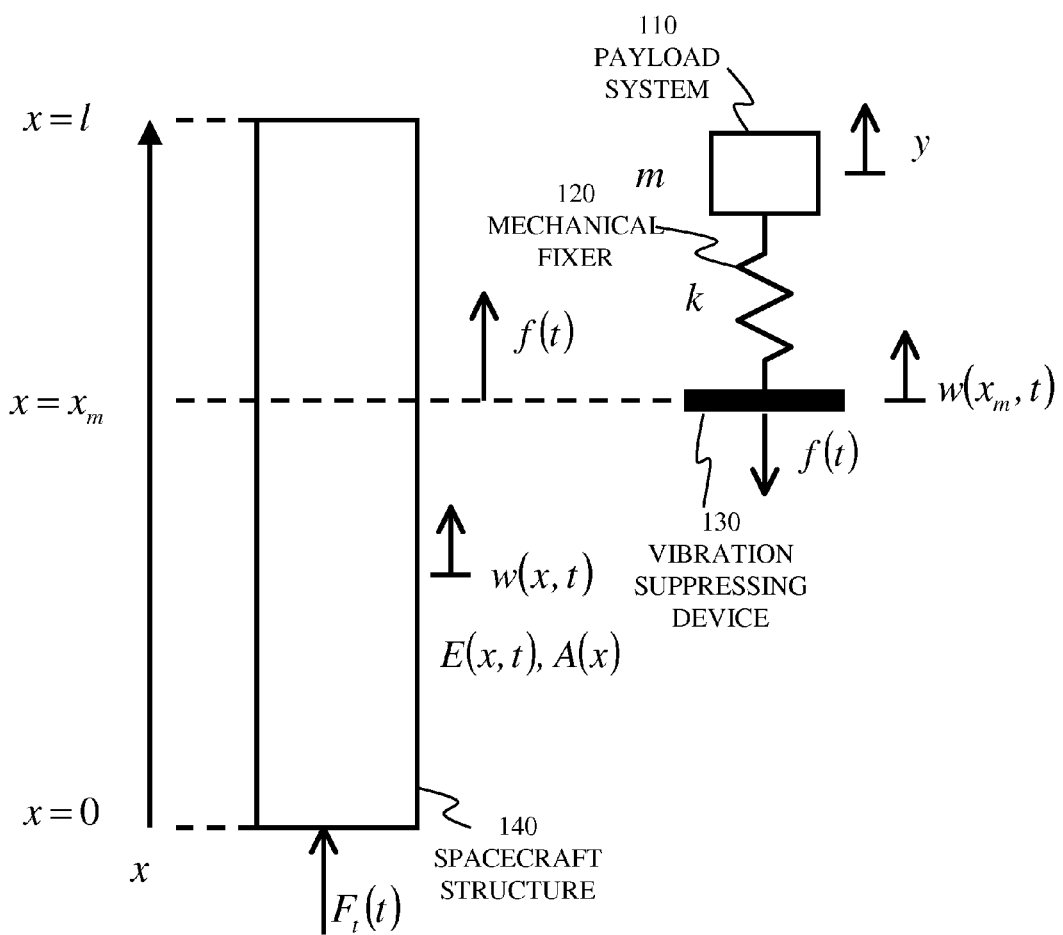
FIG. 5 is a free body diagram of a payload system, a mechanical fixer, the vibration suppressing device and a spacecraft structure of the type of which an exemplary embodiment of the invention may be advantageously employed.

FIG. 5 is a free body diagram of a payload system, a mechanical fixer, a vibration suppressing device and a spacecraft structure of the type of which an exemplary embodiment of the invention may be advantageously employed. In FIG. 5 $F_t(t)$ is a thrust [N], x is a location on the spacecraft structure 140 [m], $x_m$ is the payload position [m], l is a length of the spacecraft structure 140 [m], $E(x,t)$ is a modulus of elasticity of the spacecraft structure 140 [Pa], $A(x)$ is an area of the spacecraft structure 140 [m$^2$], $w(x,t)$ is the spacecraft deflection [m], $f(t)$ is a force generated by the vibration suppressing device 130 [N], y is a position of the payload system 110 [m], k is a stiffness of the mechanical fixer 120 [N/m] and m is a mass of the payload system 110 [g].

Equations of motion of the spacecraft are derived as (1) through (3).

$$\rho \frac{\partial^2 w(x,t)}{\partial t^2} - \frac{\partial}{\partial x}\left[E(x,t)A(x)\frac{\partial w(x,t)}{\partial x}\right] = f(t)\delta(x - x_m) + F_t(t)\delta(x) \quad (1)$$

$$f(t) = k[y - w(x_m, t)] \quad (2)$$

$$m\ddot{y} + k[y - w(x_m, t)] = 0 \quad (3)$$

where ρ is a mass density of the spacecraft structure 140 [kg/m] and $\delta(\cdot)$ is Dirac's delta function.

Substituting (2) into (1) yields (4).

$$\rho \frac{\partial^2 w(x,t)}{\partial t^2} - \frac{\partial}{\partial x}\left[E(x,t)A(x)\frac{\partial w(x,t)}{\partial x}\right] = \backslash k[y - w(x_m,t)]\delta(x - x_m) + F_t(t)\delta(x) \quad (4)$$

Approximating the modulus of elasticity of the spacecraft structure 140 and the area of the spacecraft structure 140 as constant, they can be rewritten as (5) and (6).

$$E(x,t) \approx E_0 \quad (5)$$

$$A(x) \approx A_0 \quad (6)$$

Substituting (5) and (6) into (4) yields (7).

$$\rho \frac{\partial^2 w(x,t)}{\partial t^2} - E_0 A_0 \frac{\partial^2 w(x,t)}{\partial x^2} = \backslash k[y - w(x_m,t)]\delta(x - x_m) + F_t(t)\delta(x) \quad (7)$$

Derivation of a modal form of (7) is expounded in what follows. First, homogeneous equation of (7) is given as (8).

$$\rho \frac{\partial^2 w(x,t)}{\partial t^2} - E_0 A_0 \frac{\partial^2 w(x,t)}{\partial x^2} = 0 \quad (8)$$

Substituting (9) into (8) yields (10).

$$w(x,t) = u(x)e^{j\omega t} \quad (9)$$

$$-\omega^2 \rho u(x) - E_0 A_0 \frac{d^2 u(x)}{dx^2} = 0 \text{ for } x \in (0, l) \quad (10)$$

where u(x) is an eigenfunction $$\left[m^{\frac{1}{2}}/kg^{\frac{1}{2}}\right]$$

and ω is a natural frequency [rad/s].

Solving (10) yields (11).

$$u(x) = c_1 \cos\sqrt{\frac{\rho}{E_0 A_0}} \omega x + c_2 \sin\sqrt{\frac{\rho}{E_0 A_0}} \omega x \quad (11)$$

where $c_1$ and $c_2$ are some constants to be determined in what follows.

Boundary conditions are written as (12) and (13).

$$E(0,t)A(x)\frac{\partial W(0,t)}{\partial x} = 0 \quad (12)$$

$$E(l,t)A(x)\frac{\partial W(l,t)}{\partial x} = 0 \quad (13)$$

A first order derivative of the eigenfunction with respect to the location on the spacecraft structure x is derived as (14).

$$\frac{du(x)}{dx} = \quad (14)$$

$$-c_1\sqrt{\frac{\rho}{E_0 A_0}}\omega \sin\sqrt{\frac{\rho}{E_0 A_0}}\omega x + c_2\sqrt{\frac{\rho}{E_0 A_0}}\omega \cos\sqrt{\frac{\rho}{E_0 A_0}}\omega x$$

From (12), (13) and (14), (15) and (16) are obtained.

$$c_2 = 0 \quad (15)$$

$$\sqrt{\frac{\rho}{E_0 A_0}} \omega l = n\pi \quad (16)$$

where n is a natural number.

Solving (16) for the natural frequency ω yields (17).

$$\omega = \omega_n = \frac{n\pi}{l}\sqrt{\frac{E_0 A_0}{\rho}}, n \in \{1, 2, \ldots\} \quad (17)$$

Substituting (15) and (17) into (11) yields an n-th eigenfunction as (18).

$$u_n(x) = c_{1n}\cos\sqrt{\frac{\rho}{E_0 A_0}}\omega_n x \quad (18)$$

where $u_n(x)$ is the n-th eigenfunction and $c_{1n}$ is an n-th constant to be determined in what follows.

The n-th eigenfunction $u_n(x)$ is normalized with respect to the mass density of the spacecraft structure 140 ρ as (19).

$$\langle \rho u_n, u_n \rangle = \int_0^l c_{1n}^2 \cos^2\sqrt{\frac{\rho}{E_0 A_0}}\omega_n x\, dx \quad (19)$$

$$= \int_0^l c_{1n}^2 \cos^2\frac{n\pi}{l}x\, dx$$

$$= \frac{c_{1n}^2}{2}\int_0^l \left(\cos\frac{2n\pi}{l}x + 1\right)dx$$

$$= \frac{c_{1n}^2}{2} = 1$$

The n-th constant $c_{1n}$ is determined from (19) as (20).

$$c_{1n} = \sqrt{\frac{2}{l}} \quad (20)$$

Substituting (20) into (18) yields the n-th eigenfunction as in (21).

$$u_n(x) = \sqrt{\frac{2}{l}}\cos\frac{n\pi}{l}x \quad (21)$$

The deflection of the spacecraft structure w(x,t) is expressed as a sum of products of the plurality of eigenfunctions $u_n(x)$, $n \in \{1, 2, \ldots\}$ and a plurality of spacecraft modal coordinates $q_n(t)$, $n \in \{1, 2, \ldots\}$ as in (22).

$$w(x, t) = \sum_{n=1}^{\infty} u_n(x) q_n(t) \qquad (22)$$

Substituting (22) into (7) yields (23) and (24).

$$\ddot{q}_n(t) + \omega_n^2 q_n(t) = g_n(t) \qquad (23)$$

$$g_n(t) = \int_0^l \{k[y - w(x_m, t)]\delta(x - x_m) + F_t(t)\delta(x)\} u_n(x) dx \qquad (24)$$
$$= k[y - w(x_m, t)] u_n(x_m) + F_t(t) u_n(0)$$
$$= k y u_n(x_m) - k u_n(x_m) \sum_{i=1}^{\infty} u_i(x_m) q_i(t) + F_t(t) u_n(0)$$

where $g_n(t)$ is an n-th modal force [N] and $q_n(t)$ is an n-th spacecraft modal coordinate [m].

From (3), (23) and (24), (25) is obtained.

$$\ddot{q}_n + \omega_n^2 q_n = F_t u_n(0) - m\ddot{y} u_n(x_m) \qquad (25)$$

Substituting (22) into (3) yields (26).

$$m\ddot{y} + ky = k\sum_{i=1}^{\infty} u_i(x_m) q_i(t) \qquad (26)$$

The n-th spacecraft modal coordinate can be approximated as (27).

$$q_n(t) = \int_0^l u_n(x) w(x, t) dx \qquad (27)$$
$$\approx \frac{l}{h} \sum_{i=0}^{h-1} u_n(x_i) w(x_i, t)$$

where $x_i$ is an i-th location on the spacecraft structure 140 [m], h is a number of spacecraft deflection sensors 131.

Substituting (27) into (26) and taking Laplace transform yields (28).

$$(ms^2 + k)Y(s) = k\sum_{i=1}^{\infty} u_i(x_m) Q_i(s) \qquad (28)$$

where s is a Laplace variable, Y(s) is a Laplace transform of the position of the payload system 110 y and $Q_i(s)$ is a Laplace transform of the i-th spacecraft modal coordinate $q_i$.

Since the frequency of the vibration transmitted from the spacecraft structure 140 is generally much higher than a natural frequency of the payload system 110 and the mechanical fixer 120, (28) can be rewritten as (29).

$$ms^2 Y(s) = \frac{ms^2}{ms^2 + k} k\sum_{i=1}^{\infty} u_i(x_m) Q_i(s) \qquad (29)$$
$$\approx k\sum_{i=1}^{\infty} u_i(x_m) Q_i(s)$$

Taking inverse Laplace transform of (29) yields (30).

$$m\ddot{y} \approx k\sum_{i=1}^{\infty} u_i(x_m) q_i \qquad (30)$$

Substituting (30) into (25) yields the modal form of (7) as (31).

$$\ddot{q}_n + [\omega_n^2 + k u_n^2(x_m)] q_n = \qquad (31)$$
$$F_t u_n(0) - k u_n(x_m) \sum_{i=1}^{n-1} u_i(x_m) q_i - k u_n(x_m) \sum_{i=n+1}^{\infty} u_i(x_m) q_i$$

A fluctuation of the n-th spacecraft modal coordinate $\Delta q_n$ is obtained by applying a high pass filter to the n-th spacecraft modal coordinate $q_n$ as (32).

$$\Delta q_n = \text{HPF}(q_n) \qquad (32)$$

where HPF(•) is the high pass filter that passes only the plurality of fluctuations of spacecraft modal coordinates.

A control input in (33) is applied to the spacecraft structure 140 and the mechanical fixer 120.

$$f_c = c[\dot{y} - \dot{w}(x_m, t)] \qquad (33)$$

where $f_c$ is the control input [N] and c is an intermediate parameter [N*s/m] given by (34).

$$c = \frac{2\zeta_N \omega_N \dot{q}_N}{\dot{y} - \dot{w}(x_m, t)} \qquad (34)$$

where N is an index of a modal coordinate with a largest amplitude of fluctuation thereof and $\zeta_N$ is a control parameter. Then, an amplitude of vibration of the payload system 110 is reduced where an amount of reduction depends on the payload position $x_m$.

The optimal payload position minimizing the vibration transmitted from the spacecraft structure 140 to the payload system 110 can be obtained as the payload position $x_m$ minimizing the cost function (35).

$$J = \left[\sum_{i \in \Omega} \|\Delta q_i\| u_i(x_m)\right]^2, \; x_m \in (x_{lim}, l) \qquad (35)$$

where $\Omega$ is a set of indices of a plurality of modes dominant in the vibration transmitted from the spacecraft structure 140 and $x_{lim}$ is a lower bound of the payload position below which the payload system 110 cannot be located due to functional reasons. Such functional reasons include an occupation of a lower part of the spacecraft by a propulsion system and a stage disconnected during lift-off.

Figure 2:
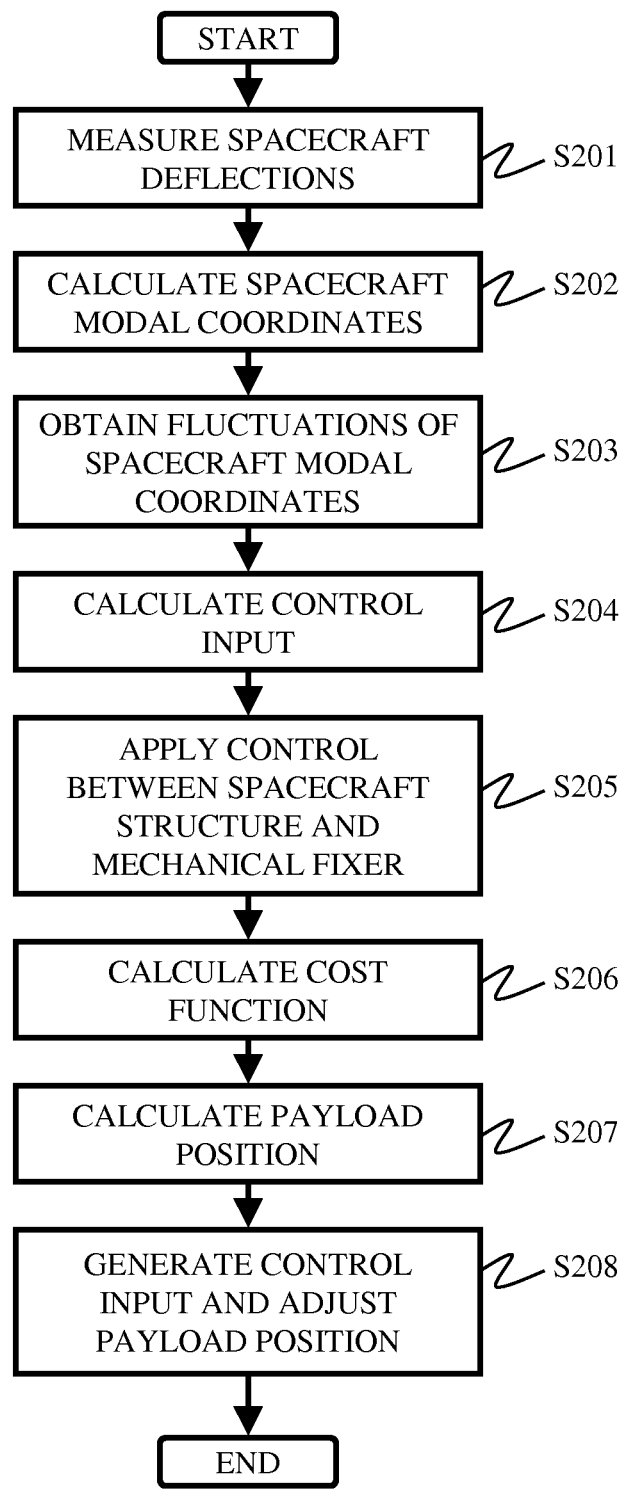
FIG. 2 is a flowchart showing a processing flow of the vibration suppressing device for spacecraft in accordance with an exemplary embodiment of the invention.

Next a processing flow of the vibration suppressing device is described using FIG. 2. FIG. 2 is a flowchart showing the processing flow of the vibration suppressing device for spacecraft in accordance with an exemplary embodiment of the invention. While the propulsion system produces thrust by an expulsion of a high-speed fluid exhaust generated by high-pressure combustion of the propellant, the plurality of spacecraft deflection sensors 131 at a plurality of locations on the spacecraft structure 140 measure a plurality of spacecraft deflections $w(x_i, t)$, $i \in \{1, 2, \ldots, h\}$ where h is the number of spacecraft deflection sensors 131 (S201).

The spacecraft modal coordinate calculation unit 132 receives the plurality of spacecraft deflections $w(x_i,t)$, $i \in \{1, 2, \ldots, h\}$ and calculates the plurality of spacecraft modal coordinates using (27) where a plurality of eigenfunctions evaluated at the payload position $u_i(x_m)$, $i \in \{1, 2, \ldots, h\}$ are calculated using (21) (S202).

The high pass filter 133 generates the plurality of fluctuations of spacecraft modal coordinates using (32) (S203).

The payload position adjustment device 136 calculates the control input $f_c$ in (33) (S204), and applies the control input $f_c$ to the mechanical fixer 120 and the spacecraft structure 140 (S205).

The cost function calculation unit 134 calculates the cost function in (35) where the set of indices of the plurality of modes dominant in the vibration transmitted from the spacecraft structure 140 $\Omega$ is selected as a set of indices of the plurality of fluctuations of spacecraft modal coordinates fulfilling (36).

$$\frac{\|\Delta q_i\|}{\sum_{i=1}^{h} \|\Delta q_i\|} \geq d_q \quad (36)$$

where $d_q \in (0,1)$ is a threshold classifying the plurality of fluctuations of spacecraft modal coordinates (S206).

The payload position calculation unit 135 calculates the optimal payload position that is the payload position $x_m$ minimizing the cost function (35). For such minimization, a plurality of payload positions $x_m$ that fulfill (37) or are a plurality of elements of a set $\{x_{lim}, l\}$ are selected as a plurality of candidates of optimal payload position. Then, one of the candidates of optimal payload position giving a smallest value of the cost function (35) is selected as the optimal payload position (S207).

$$\frac{dJ}{dx_m} = 0 \wedge \frac{d^2J}{dx_m^2} > 0 \quad (37)$$

The payload position adjustment device 136 applies the control input in (33) to the spacecraft structure 140 and the mechanical fixer 120, and adjusts the payload position $x_m$ to the optimal payload position obtained in step S207 (S208).

Steps S201 through S208 are repeated while the propulsion system produces thrust by an expulsion of a high-speed fluid exhaust generated by high-pressure combustion of the propellant.

Hereinafter, simulation results of aforementioned control processes of the vibration suppressing device for spacecraft in accordance with an exemplary embodiment of the invention are described in detail. The simulation assumes an archetypal-tall-thin-shaped spacecraft launched vertically. The parameters used in the simulation are given in (38).

$$m = 45 \times 10^3 \text{ [kg]}, M = 2.8 \times 10^6 \text{ [kg]}, E_0 = 105 \times 10^9 \text{ [Pa]},$$
$$A_0 = 2\pi r t_r \text{[m}^2\text{]}, k = 1 \times 10^3 \text{ [N/m]}, t_r = 5 \times 10^{-2} \text{ [m]},$$
$$r = 5 \text{ [m]}, l = 110 \text{ [m]}, \rho = M/l \text{[kg/m]}, x_{lim} = 70 \text{ [m]},$$
$$F_t = 33 \times 10^6 \text{ [N]}, c_t = 1 \times 10^{-4}, \omega_t = 10(2\pi) \text{ [rad/s]},$$
$$g = 9.8 \text{ [m/s}^2\text{]} \quad (38)$$

where $t_r$ is a radial thickness of outer surface of the spacecraft structure 140, r is a radius of the spacecraft structure 140, $c_t$ is a fraction of the thrust that causes a vibration transmitted to the payload system 110, $\omega_t$ is a frequency of the fraction of the thrust and g is a gravitational acceleration. It is also assumed in the simulation that a tenth and higher modes have only a negligible contribution to a dynamics of the spacecraft, and damping ratios of first ten modes are 0.7, 0.5, 0.4, 0.3, 0.2, 0.2, 0.4, 0.3, 0.2 and 0.2, respectively. The parameters are of the spacecraft with a plurality of vibration suppressing measures described in the prior arts in U.S. Pat. No. 8,033,111 B2, U.S. Pat. No. 7,967,282 B2, and L. A. Nassar, R. Bonifant, C. Diggs, E. Hess, R. Homb, L. McNair, E. Moore, P. Obrist, M. Southward, "Spacecraft Structures and Launch Vehicles", Nov. 18, 2004. The following simulation illustrates a further reduction of vibration by the current invention.

Figure 6:
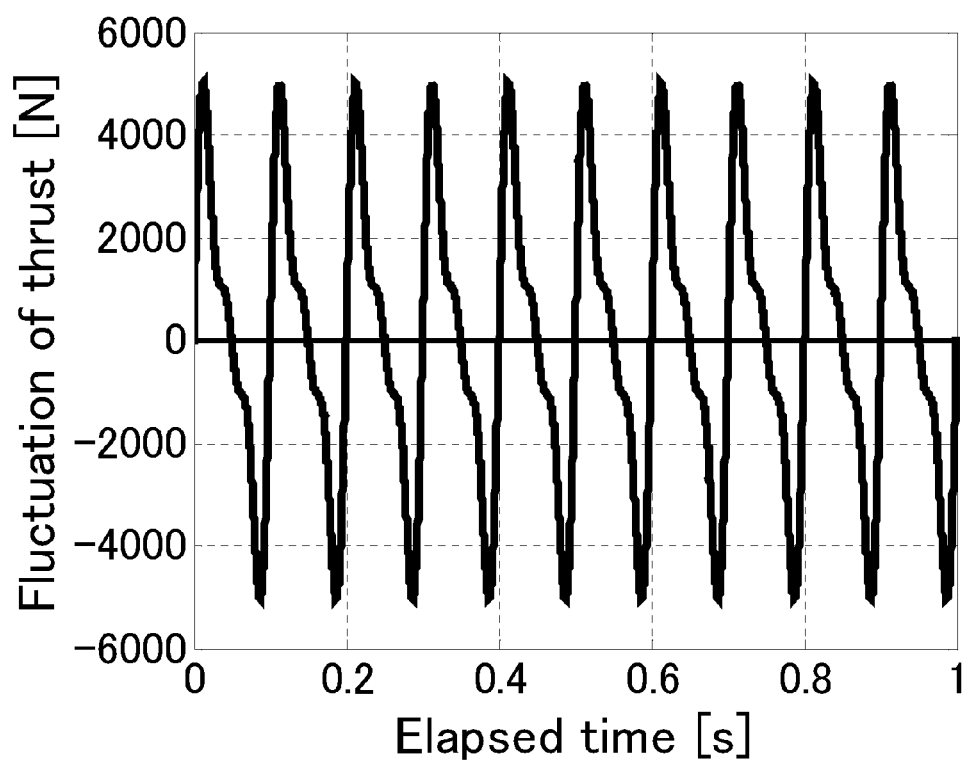
FIG. 6 is a simulation result of an exemplary embodiment of the invention showing a fluctuation of thrust.

FIG. 6 is a simulation result of an exemplary embodiment of the invention showing the fluctuation of thrust. The fluctuation of thrust in FIG. 6 is an example of pogo oscillation during lift-off. The frequency of the fluctuation of thrust $\omega_t$ is selected close to a first natural frequency 11.57 [Hz] calculated by (17).

Figure 7:
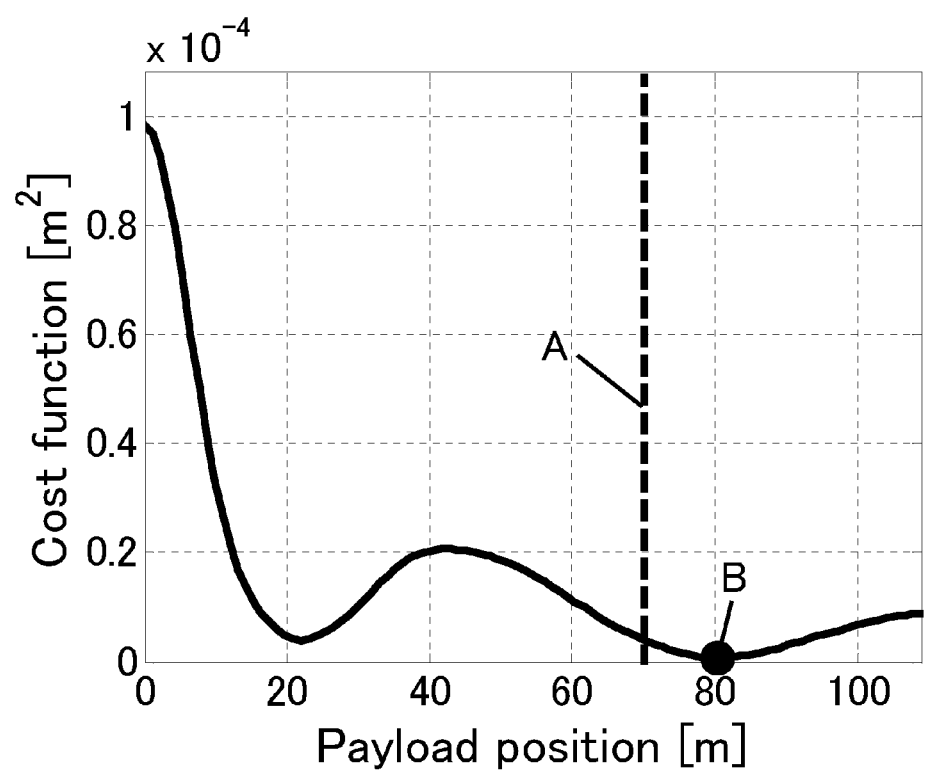
FIG. 7 is a simulation result of an exemplary embodiment of the invention showing a cost function.

FIG. 7 is a simulation result of an exemplary embodiment of the invention showing the cost function. In FIG. 7 a solid line represents the cost function, a dashed line A represents the lower bound of the payload position and a dot B represents the optimal payload position. As mentioned earlier, the payload position adjustment device 136 generates the control input $f_c$ with the control parameter $\zeta_1 = 9.3$ based on (33) and (34) to suppress the vibration of the first mode having the largest amplitude of fluctuation. Then the cost function calculation unit 134 calculates the solid line, and the payload position calculation unit 135 finds the optimal payload position at 80.3 [m] represented by the dot B minimizing the cost function above the lower bound of the payload position represented by the dashed line A.

Figure 8:
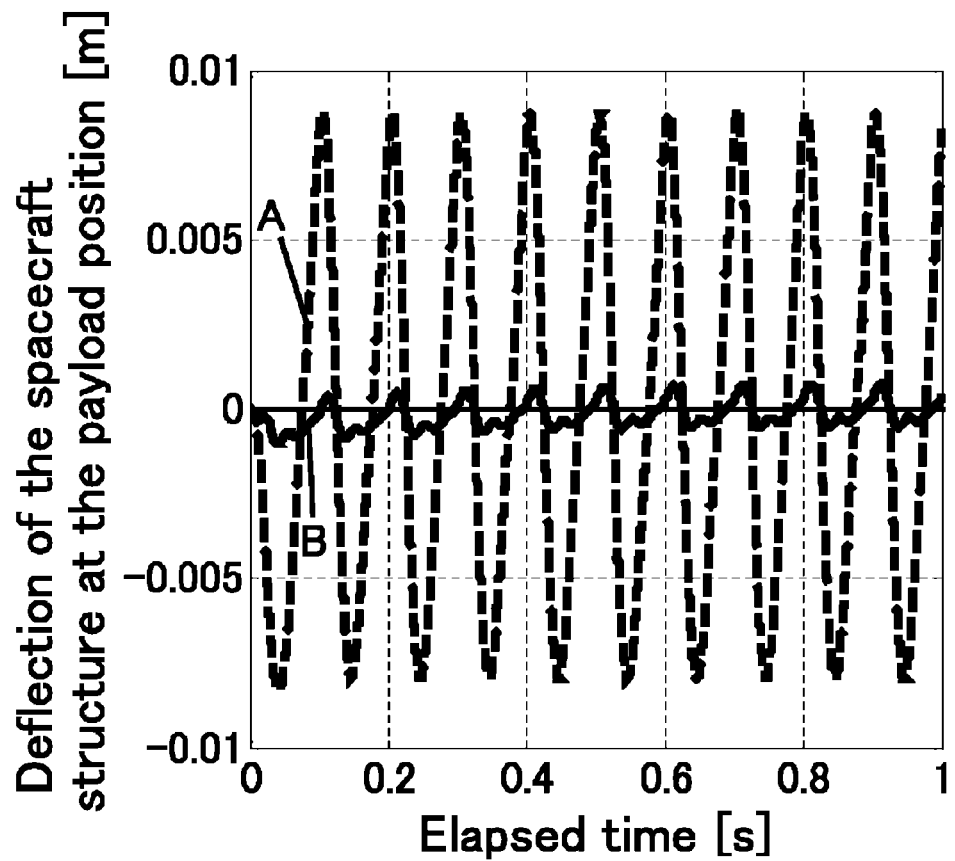
FIG. 8 is a simulation result of an exemplary embodiment of the invention showing a comparison between two deflections of the spacecraft structure at a payload position before and after applying the current invention.

FIG. 8 is a simulation result of an exemplary embodiment of the invention showing a comparison between two deflections of the spacecraft structure at the payload position before and after applying the current invention. The payload position before applying the current invention is $x_m = 110$ [m], and an amplitude of the deflection of the spacecraft structure at the payload position is $8.5 \times 10^{-3}$ [m]. After applying the current invention with the aforementioned parameters, the deflection of the spacecraft structure at the payload position (i.e., the vibration transmitted to the payload system 110) is reduced to $9.0 \times 10^{-4}$ [m] that is 9.45 times as small as the one before applying the current invention.

It should be noted that the prior art in U.S. Pat. No. 7,461,728 B2, if applied to the spacecraft, is unable to reduce the vibration transmitted to the payload system 110 as much as the current invention if a plurality of sensors, a logic circuit and an actuator of equivalent specifications are employed, since an effect of vibration reduction by the present invention is mainly influenced by a set of amplitudes of the eigenfunctions of the dominant modes but is less influenced by a time delay of its control loop whereas that by the prior art in U.S. Pat. No. 7,461,728 B2 is mainly influenced by a time delay in its control loop including a plurality of sensors, a logic circuit, an actuator and the active mass.

Although the above simulation assumes an archetypal-tall-thin-shaped spacecraft possessing specific dimensions and material properties, the current invention can be applied, with a minor modification apparent to those skilled in the art, to a variety of spacecrafts possessing various shapes and made of various materials.

The vibration suppressing device for spacecraft in the foregoing embodiment can be realized as an electrical/electronic/programmable electronic system. Examples of the electrical/electronic/programmable electronic system include but are not limited to a control system comprising an application specific integrated circuit (ASIC) or a microcontroller.

While, in the foregoing embodiment, the self-excited combustion oscillation of the propellant is considered, the present invention can also take into account other types of vibrations transmitted to the payload system 110 by replacing $F_r(t)\delta(x)$ with $F_r(t)\delta(x-x_v)$ in (1) where $x_v$ is a location of a source of vibration.

The modulus of elasticity of the spacecraft structure 140 and the area of the spacecraft structure 140 can be treated as functions of the location on the spacecraft structure 140 x instead of approximating them as constant values as in (5) and (6). In this case the equations of motion of the spacecraft are reformulated as a set of spacially discretized ordinary differential equations. Then, the control input in (33) and the cost function in (35) can be derived analogously to the foregoing embodiment by solving an eigenvalue problem for the set of spacially discretized ordinary differential equations.

The described embodiments of the present invention are only exemplary and numerous variations thereof apparent to those skilled in the art are intended to be within the scope of the current invention as defined in the following claims.

The invention claimed is:

1. A vibration suppressing device for a spacecraft comprising a payload system carried by the spacecraft into space, a spacecraft structure for supporting the payload system and producing thrust, and a mechanical fixer for attaching the payload system to the spacecraft structure, where the spacecraft structure includes a mechanical structure forming the basic shape of the spacecraft and a propulsion system producing thrust by an expulsion of a high-speed fluid exhaust generated by high-pressure combustion of a propellant, the vibration suppressing device comprising:

a plurality of spacecraft deflection sensors measuring a plurality of spacecraft deflections at a plurality of locations on the spacecraft structure;

a spacecraft modal coordinate calculation unit calculating a plurality of spacecraft modal coordinates based on the plurality of spacecraft deflections received from the plurality of spacecraft deflection sensors using a modal transformation;

a high pass filter extracting a plurality of fluctuations of spacecraft modal coordinates from the spacecraft modal coordinates received from the spacecraft modal coordinate calculation unit;

a cost function calculation unit calculating a cost function that is a squared weighted sum of a plurality of eigenfunctions of the spacecraft structure as a function of a payload position where the payload system is attached to the spacecraft structure with a plurality of weights being proportional to a plurality of absolute values of a plurality of fluctuations of spacecraft modal coordinates of a plurality of modes received from the high pass filter which the plurality of eigenfunctions belong to;

a payload position calculation unit calculating an optimal payload position minimizing the cost function received from the cost function calculation unit either by an analytical method or a numerical method;

a payload position adjustment device consisting of an actuator mechanically connected to the mechanical fixer and the spacecraft structure, generating a control input based on the plurality of fluctuations of spacecraft modal coordinates, adjusting the payload position based on the optimal payload position received from the payload position calculation unit, and minimizing a vibration transmitted from the spacecraft structure to the mechanical fixer and thus to the payload system.

\* \* \* \* \*